C. Locher,
Hose Coupling.
No. 110,253. Patented Dec. 20, 1870.
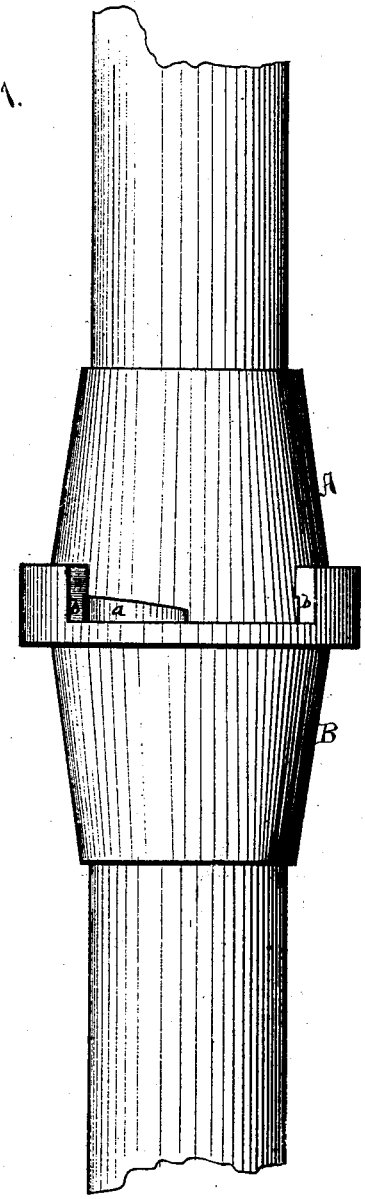
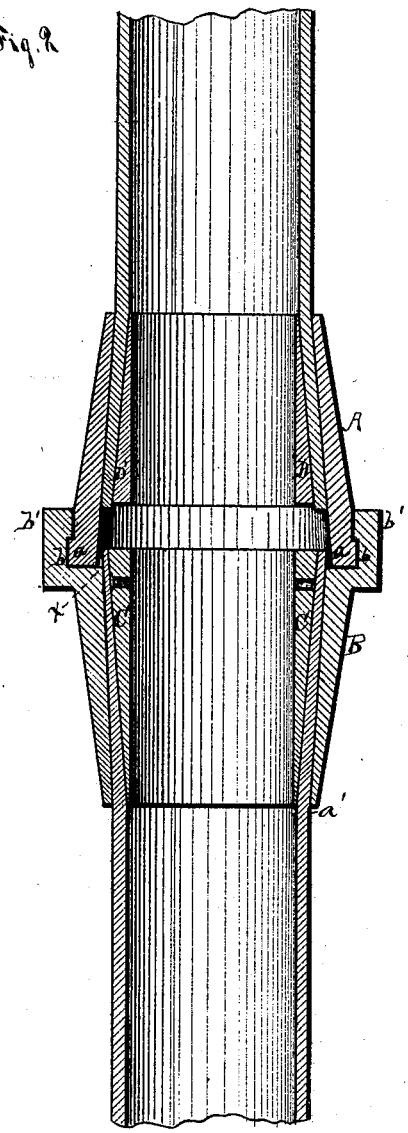
Witnesses:
J. C. Wildman
Geo. H. Pierson
Inventor:
Conrad Locher by
H. W. Bleader atty

United States Patent Office.

CONRAD LOCHER, OF OROVILLE, CALIFORNIA, ASSIGNOR TO HIMSELF AND GEORGE C. PERKINS, OF SAME PLACE.

Letters Patent No. 110,253, dated December 20, 1870.

IMPROVEMENT IN HOSE-COUPLINGS.

The Schedule referred to in these Letters Patent and making part of the same.

*To all whom it may concern:*

Be it known that I, CONRAD LOCHER, of Oroville, in the county of Butte and State of California, have invented a new and useful Improvement in Hose-Couplings; and I do hereby declare that the following is a full and exact description of the same, reference being had to the accompanying drawing and to the letters of reference marked thereon.

This invention relates to that class of hose-couplings which have the parts united by means of segmental projections upon one part, and corresponding grooves upon the other, and consists in certain details of construction, which will be fully described hereinafter.

In the drawing—

Figure 1 represents an elevation, and

Figure 2, a sectional view of the coupling.

To enable others skilled in the art to make and use my invention, I will now proceed to describe fully its construction and manner of operation.

A and B represent short metal tubes, which bear a general resemblance to each other, and are made tapering in form, with their lesser inner diameter corresponding with the outside diameter of the hose to which they are to be applied, as is shown at $a'$, fig. 2.

The part A is provided at its larger end upon its outer surface with two or more segmental projections $a\ a$, which fit into corresponding grooves $b\ b$ upon the part B, the latter being formed in the overhanging projections $b'\ b'$, as clearly shown in fig. 2.

The projections $a\ a$ are provided upon their rear sides with edges tapering in both directions.

By means of this construction the parts A B are united by placing the projections $a\ a$ between the projections $b'\ b'$, and turning the parts in opposite directions either way.

By means of the tapering form of the projections $a\ a$, the parts are drawn closely together.

Into these tubes A B the ends of the hose are introduced and fitted, the end in part B being caused to project a little beyond the line of the inner ring, as shown at $x$, in order that both ends of the hose may meet in A.

C and D represent thimbles, which are made tapering in form to correspond with the tubes A and B. These are driven inside the hose ends until the ends are flush with the hose ends, and they are then fastened in place.

By means of these thimbles the ends of the hose are expanded and securely held against displacement.

The thimble C is provided with an annular groove, $c$, near its larger end, beneath the projecting end of the hose, as is shown in fig. 2.

Small orifices are made in the groove, which connect with the inside of the thimble.

By means of this construction the water or other fluid, when the hose is in use, passes through these orifices and forces the projecting end of the hose tightly against the adjacent end of the part A and forms a perfectly tight-joint.

This coupling can be instantly put together or taken apart with wrench, spanner, or other tool.

I do not claim the elements herein described in themselves, for I am aware that they are not new; but having thus fully described my invention,

What I claim as new, and desire to secure by Letters Patent, is—

The combination of the parts A and B, thimbles C and D, and the hose ends, the thimble C being provided with orifices for admitting the water beneath the hose end to form a water-tight packing, as described.

This specification signed and witnessed this 27th day of September, 1870.

C. LOCHER.

Witnesses:
J. L. KINNY,
JOHN DICK.